(12) United States Patent
Murakami et al.

(10) Patent No.: US 6,469,091 B2
(45) Date of Patent: Oct. 22, 2002

(54) POLYARYLENE SULFIDE RESIN COMPOSITION

(75) Inventors: Tomoyoshi Murakami, Ichihara (JP); Toru Iga, Ichihara (JP); Shigemasa Suzuki, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/986,879

(22) Filed: Nov. 13, 2001

(65) Prior Publication Data
US 2002/0055582 A1 May 9, 2002

Related U.S. Application Data

(62) Division of application No. 09/622,920, filed as application No. PCT/JP00/00128 on Jan. 13, 2000, now abandoned.

(30) Foreign Application Priority Data

Jan. 14, 1999 (JP) .................................. 11-7822

(51) Int. Cl.$^7$ ........................... C08J 5/00; C08F 128/06
(52) U.S. Cl. ...................... 524/492; 524/493; 528/373; 528/395; 525/328.5
(58) Field of Search ................. 524/492, 493; 528/373, 395; 525/328.5

(56) References Cited

U.S. PATENT DOCUMENTS

| 4,749,598 A | 6/1988 | Philips |
| 5,733,962 A | 3/1998 | Osako et al. |
| 5,912,320 A | * 6/1999 | Hotta et al. .................. 528/373 |
| 6,042,910 A | 3/2000 | Kinouchi et al. |

FOREIGN PATENT DOCUMENTS

| JP | 1-248546 A | 10/1989 |
| JP | 12-1615 A | 1/2000 |
| JP | 12-7923 A | 1/2000 |

* cited by examiner

Primary Examiner—Duc Truong
(74) Attorney, Agent, or Firm—Oblon, Spivak, McClelland, Maier & Neustadt, P.C.

(57) ABSTRACT

Provided is a polyarylene sulfide resin composition comprising (A) from 20 to 34% by weight of a polyarylene sulfide having a melt viscosity of from 150 to 800 poises, (B) from 66 to 80% by weight of spherical silica having a mean particle size of from 0.3 to 10 μm, and (C) from 0 to 12% by weight of whiskers, in which the total of the spherical silica (B) and the whiskers (C) falls between 66 and 80% by weight. The composition has well-balanced physical properties of dimensional accuracy and mechanical strength, and has good moldability. It is favorable to moldings for precision members such as optical fiber connector ferrules, etc.

7 Claims, 1 Drawing Sheet

POLYARYLENE SULFIDE RESIN COMPOSITION

This is a division of application Ser. No. 09/622,920, filed Sep. 7, 2000 now abandoned, which is a 371 of PCT/JP00/00128, filed Jan. 13, 2000, based on Japanese Application JP11/7822, filed Jan. 14, 1999.

TECHNICAL FIELD

The present invention relates to a polyarylene sulfide resin composition to be molded into precision members. Precisely, it relates to such a resin composition to be molded into precision members, which is favorable to optical communication members such as optical fiber connector ferrules and others and also to optical pickup members, etc.

BACKGROUND ART

Silica-containing epoxy resin compositions have heretofore been used for precision members such as optical fiber connector ferrules and others in the field of optical communication. However, the epoxy resin compositions require long molding cycles, and recycling them is difficult. These problems with them are peculiar to thermosetting resins.

Substitutable for them, thermoplastic polyarylene sulfide (PAS) resin compositions have been proposed. For example, in Japanese Patent Laid-Open No. 196208/1982, proposed is a PAS resin composition containing a spherical silica filler; and in Japanese Patent Laid-Open No. 299072/1994, proposed is a PAS resin composition containing silica, in which the filler, silica is subjected to surface treatment with a silane coupling agent. In PCT patent document No. WO95/25770, proposed is a PAS resin composition containing whiskers and spherical silica.

However, the resin compositions proposed are still unsatisfactory with respect to the balance of dimensional accuracy and mechanical strength.

The present invention is to provide a polyarylene sulfide resin composition which has the advantages of well-balanced physical properties, dimensional accuracy and mechanical strength, and good moldability, and is therefore favorable to moldings for precision members such as optical fiber connector ferrules and others.

DISCLOSURE OF THE INVENTION

In our studies of polyarylene sulfide resin compositions that are directed to improving the balance of the dimensional accuracy, the mechanical strength and the moldability of the resin compositions, especially to improving the dimensional accuracy thereof, we, the present inventors have found that, when the amount of whiskers which are effective for reinforcement but are unsatisfactory for dimensional accuracy improvement is reduced in the resin compositions and when, in place of it, the amount of a polyarylene sulfide having a specific melt viscosity and the amount of spherical silica having a specific particle size are increased therein, then the intended object can be attained. On the basis of this finding, we have completed the present invention disclosed herein.

Specifically, the invention is summarized as follows:

(1) A polyarylene sulfide resin composition comprising (A) from 20 to 34% by weight of a polyarylene sulfide having a melt viscosity of from 150 to 800 poises at 300° C. in terms of the resin temperature and at a shear rate of 500 sec$^{-1}$, (B) from 66 to 80% by weight of spherical silica having a mean particle size of from 0.3 to 10 μm, and (C) from 0 to 12% by weight of whiskers, in which the total of the spherical silica (B) and the whiskers (C) falls between 66 and 80% by weight.

(2) A polyarylene sulfide resin composition comprising (A) from 22 to 28% by weight of a polyarylene sulfide having a melt viscosity of from 150 to 800 poises at 300° C. in terms of the resin temperature and at a shear rate of 500 sec$^{-1}$, (B) from 72 to 78% by weight of spherical silica having a mean particle size of from 0.3 to 10 μm, and (C) from 0 to 6% by weight of whiskers, in which the total of the spherical silica (B) and the whiskers (C) falls between 72 and 78% by weight.

(3) A polyarylene sulfide resin composition, of which the tabular moldings formed to have through-holes running through their cross section are such that the circularity of the through-holes is at most 1.8 μm, the coefficient of thermal expansion of the moldings (both in MD and TD) is at most 1.8×10$^{-5}$/K, and the flexural strength of the moldings is at least 120 MPa.

Figure 1:
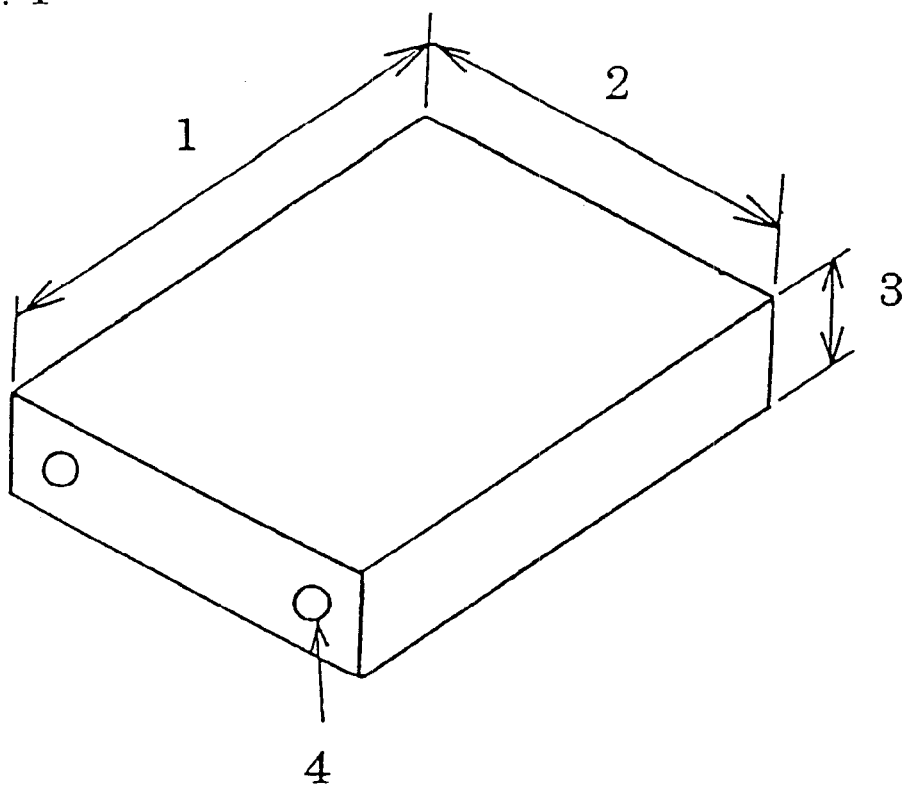
FIG. 1 is a perspective view showing a tabular molding for measuring the circularity of the through-holes running through it.

Description of Reference Numerals:
1: Length (8 mm)
2: Width (7 mm)
3: Thickness (2 mm)
4: Through-hole (0.7 mmφ)

BEST MODES OF CARRYING OUT THE INVENTION (A) Polyarylene sulfide:

Polyarylene sulfide for use in the invention is a polymer having at least 70 mol % of repetitive units of a structural formula, [—Ar——] wherein Ar indicates an arylene group and S indicates sulfur. Typically, it has at least 70 mol % of repetitive units of the following structural formula (I):

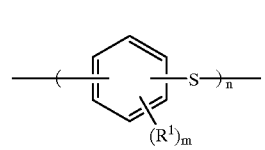

wherein R$^1$ indicates a substituent selected from an alkyl or alkoxy group having at most 6 carbon atoms, a phenyl group, a carboxyl group or its metal salts, an amino group, a nitro group, or a halogen atom including fluorine, chlorine and bromine atoms; m indicates an integer of from 0 to 4; and n indicates a mean degree of polymerization, falling between 1.3 and 30.

If the ratio of the repetitive units in the polymer is smaller than 70 mol %, the amount of the intrinsic crystalline component characteristic of crystalline polymers in the polymer will be small. If so, the mechanical strength of the polymer will be poor.

The polyarylene sulfide may be not only a homopolymer but also a copolymer.

The comonomer units for the copolymer polyarylene sulfide include, for example, metaphenylene sulfide units, orthophenylene sulfide units, p,p'-diphenyleneketone sulfide units, p,p'-diphenylenesulfone sulfide units, p,p'-biphenylene sulfide units, p,p'-diphenylenemethylene sulfide units, p,p'-diphenylenecumenyl sulfide units, naphthyl sulfide units, etc.

Regarding its molecular structure, the polyarylene sulfide may have any of a linear structure, a branched structure or a crosslinked structure, but preferably has a linear structure.

Specifically, the polyarylene sulfide for use in the invention may be not only a polymer having a substantially linear structure but also a polymer having a branched structure or a crosslinked structure as formed through polymerization with a small amount of additional monomers having at least 3 functional groups. If desired, the branched or crosslinked polymer may be blended with the polymer having a substantially linear structure, for use in the invention.

Also if desired, the polyarylene sulfide for use in the invention may be oxidatively or thermally crosslinked with a polymer having a relatively low molecular weight and having a substantially linear structure to increase its melt viscosity thereby to improve its moldability.

The polyarylene sulfide for use in the invention may be produced in any known method. For example, it may be obtained by polycondensing a dihalo-aromatic compound with a sulfur source in an organic polar solvent, followed by washing and drying the resulting polycondensate.

The polyarylene sulfide for use in the invention must have a melt viscosity falling between 150 and 800 poises at 300° C. in terms of the resin temperature and at a shear rate of 500 sec$^{-1}$. Preferably, its melt viscosity falls between 200 and 700 poises, more preferably between 200 and 600 poises.

If its melt viscosity is higher than 800 poises, the polyarylene sulfide will lose fluidity while molded, and the dimensional accuracy of its moldings will be poor, and, in addition, the resin is difficult to granulate. On the other hand, if the melt viscosity of the resin is lower than 150 poises, the mechanical strength of the resin moldings will be significantly low.

In case where the resin composition of the invention contains whiskers, the melt viscosity of the polyarylene sulfide therein is preferably from 150 to 700 poises, more preferably from 150 to 600 poises, even more preferably from 200 to 500 poises.

The method for measuring the melt viscosity of the resin will be described hereinunder.

(B) Spherical silica:

Spherical silica for use in the invention may be any of fused silica (amorphous silicon dioxide), or crystalline silica (quartz, tridymite, cristobalite, etc.), or may also be in any form of their mixtures.

Silica for use herein must be spherical silica. Broken amorphous silica, if added to PAS, lowers the fluidity of the resulting PAS composition, and the composition could hardly have well balanced physical properties.

The spherical silica for use herein has a mean particle size falling between 0.3 and 10 μm. Preferably, its mean particle size falls between 0.4 and 8 μm, more preferably between 1 and 8 μm. Two or more types of spherical silica that differ in their mean particle size may be combined for use in the invention, so far as the mean particle size of the silica mixture falls within the defined range. Silica having a mean particle size of smaller than 0.3 μm, if added to PAS, increases the melt viscosity of the resin composition, whereby the fluidity of the resin composition being molded will lower and the dimensional accuracy of the resin moldings will be poor. On the other hand, silica having a mean particle size of larger than 10 μm, if added to PAS, lowers the mechanical strength of the resin moldings.

It is desirable that the spherical silica for use in the invention is subjected to surface treatment with a coupling agent, preferably with a silane coupling agent. Silane compounds for the silane coupling agent include aminosilanes, vinylsilanes, phenylsilanes, epoxysilanes, etc. Of those, especially preferred are vinylsilane coupling agents as having good moisture resistance.

Surface-treated silica is more effective for further improving the mechanical strength and even the moisture absorption resistance of the PAS moldings, and is therefore expected to be effective for further enhancing the dimensional stability of the PAS moldings.

(C) Whiskers:

Whiskers for use in the invention include potassium titanate whiskers, aluminium borate whiskers, zinc oxide whiskers, calcium carbonate whiskers, titanium oxide whiskers, alumina whiskers, potassium silicate whiskers, silicon carbide whiskers, silicon nitride whiskers, aluminium silicate whiskers, magnesium pyroborate whiskers, magnesia whiskers, basic magnesium sulfate whiskers, titanium diboride whiskers, etc. Above all, preferred for use herein are calcium silicate whiskers in view of their reinforcing effect and moldability; and more preferred are calcium metasilicate whiskers.

It is desirable that the whiskers for use in the invention are subjected to surface treatment with a coupling agent, preferably with a silane coupling agent. Silane compounds for the silane coupling agent include aminosilanes, vinylsilanes, phenylsilanes, epoxysilanes, etc.

[Formulation]

The polyarylene sulfide resin composition of the invention is produced by blending from 20 to 34% by weight of the polyarylene sulfide (A), from 66 to 80% by weight of the spherical silica (B), and from 0 to 12% by weight of whiskers (C), for which the total of the spherical silica (B) and the whiskers (C) falls between 66 and 80% by weight; preferably by blending from 22 to 28% by weight of the polyarylene sulfide (A), from 72 to 78% by weight of the spherical silica (B), and from 0 to 6% by weight of whiskers (C), for which the total of the spherical silica (B) and the whiskers (C) falls between 72 and 78% by weight.

Regarding the blend ratio of the components, if the amount of the polyarylene sulfide (A) is smaller than 20% by weight, the melt viscosity of the PAS composition will increase, and the moldability thereof is therefore poor. On the other hand, if the amount of the polyarylene sulfide (A) is larger than 34% by weight, the dimensional accuracy of the PAS moldings will be poor. If the amount of the silica (B) is smaller than 66% by weight, the dimensional accuracy of the PAS moldings will be poor; but if larger than 80% by weight, the melt viscosity of the PAS composition will increase thereby to worsen the moldability of the composition. If the amount of whiskers (C) is larger than 12% by weight, the melt viscosity of the PAS composition will increase, and the PAS moldings will be greatly anisotropic. If so, the dimensional accuracy and the moldability of the moldings will be poor. If the total of the spherical silica (B) and whiskers (C) is smaller than 66% by weight, the dimensional accuracy of the PAS moldings will be poor; but if larger than 80% by weight, the melt viscosity of the PAS composition will increase to thereby worsen the moldability of the composition.

If desired, the resin composition comprising the components (A), (B) and (C) may contain a coupling agent. Preferably, the coupling agent is a silane coupling agent selected from, for example, aminosilanes, vinylsilanes, phenylsilanes, and epoxysilanes. The amount of the coupling agent that may be in the resin composition may fall between 0.3 and 3.0 parts by weight, but preferably between 0.5 and 1.5 parts by weight, relative to 100 parts by weight of the total of the components (A), (B) and (C). In case where the component (B) and the component (C) in the composition are not previously coated with a silane, adding such a coupling agent to the resin composition is especially effective.

If its amount is smaller than 0.3 parts by weight, the silane compound added to the resin composition will be ineffective for improving the mechanical strength of the resin moldings; but if larger than 3.0 parts by weight, the melt viscosity of the resin composition will increase whereby the moldability thereof will become poor.

In addition to the components mentioned above, the polyarylene sulfide resin composition of the invention may further contain any other components within the range not interfering with the effect of the invention. The additional optional components include, for example, various additives such as antioxidants, weather-proofing agents, lubricants, plasticizers, antistatic agents, colorants, etc.; thermoplastic resins and/or thermosetting resins such as polyamides, epoxy resins, silicone resins, silicone oils, polyolefins, polyether sulfones, polyphenylene ethers, etc.; rubbers such as hydrogenated SBS, hydrogenated NBR, silicone rubber, fluororubber, etc.; pigments, etc.

The polyarylene sulfide resin composition of the invention may be produced by formulating the components (A), (B) and (C), and optionally a silane compound and other additives, and kneading them in melt in a Henschel mixer, a double-screw extruder or the like, generally at a temperature falling between 280 and 350° C.

The polyarylene sulfide resin composition has the advantages of extremely high dimensional accuracy and mechanical strength. The method for measuring the dimensional accuracy of the composition will be described hereinunder. On the presumption that the composition is applied to optical fiber connector ferrules for optical communication, the dimensional accuracy of the composition is evaluated in terms of the circularity of the through-holes in tabular moldings of the composition. Concretely, the composition is molded into tabular moldings having through-holes that run through their cross section, and the circularity of the through-holes is at most 1.8 $\mu$m. In addition, the coefficient of thermal expansion of the moldings is at most $1.8 \times 10^{-5}$/K both in MD and TD, and the flexural strength indicating the mechanical strength of the moldings is at least 120 MPa.

The polyarylene sulfide resin composition of the invention has the advantages of extremely high dimensional accuracy and mechanical strength, and is therefore favorable to various members for precision instruments and machines. In particular, it is favorable to connector ferrules for optical fibers in the field of optical communications; optical pickup members; tip housings for endoscopes having a microlens embedded in the tip of microfibers; members for laser diodes, photosensors, etc.

The invention is described in more detail with reference to the following Examples.

The methods employed herein for testing the samples produced in Examples are mentioned below.
(1) Measurement of Melt Viscosity:
Using a capillograph (from Toyo Seiki), a resin sample is tested for measuring its melt viscosity (poises) at a resin temperature of 300° C. and at a shear rate of 500 sec$^{-1}$.
(2) Measurement of Mechanical Strength:
Using a 50-ton injection-molding machine (from Japan Steel Works), test pieces (127 mm×12.7 mm square×3.2 mm thickness) are prepared at a resin temperature of 330° C. and at a mold temperature of 135° C., and these are tested according to ASTM.

Precisely, the flexural strength of each test piece is measured according to ASTM790.
(3) Measurement of Spiral Flow Length:
Using a 30-ton injection molding machine (from Toshiba Kikai) to which is fitted a spiral flow mold, prepared are sample strips having a thickness of 1 mm. The resin temperature is 320° C., the mold temperature is 135° C. and the injection pressure is 1000 kg/cm$^2$. The length (mm) of the sample flow being injected in that condition is measured, and this indicates the spiral flow length of the sample tested.
(4) Determination of Coefficient of Thermal Expansion
Tabular samples (80 mm×80 mm square×3.2 mm thickness) are prepared through injection molding, and test pieces having a size of 12 mm×8 mm square×3.2 mm thickness are cut out of each sample in MD (machine direction, that is the resin flow direction) and in TD (transverse direction, that is the direction vertical to MD), relative to the center of the sample. The test pieces are tested for TMA (using Seiko Electronics Industry's TMA-120C) to determine the coefficient of thermal expansion ($10^{-5}$/K) within a temperature range of from 0 to 50° C.
(5) Determination of Dimensional Accuracy:
A tabular molding such as that illustrated in FIG. 1 (8 mm×7 mm square×2 mm thickness; diameter of through-hole, 0.7 mm$\phi$) is prepared through injection molding. The resin temperature is 330° C., and the mold temperature is 135° C. After left at room temperature for 24 hours, the sample is processed with an optical imaging instrument (Daiichi Sokuhan's IDM-30). The image data are computerized to determine the circularity ($\mu$M) of the through-hole of the sample.

The details of the components, polyarylene sulfide (a), spherical silica (b) and whiskers (c) used in Examples are mentioned below with respect to their types and properties.
(a) Polyarylene Sulfide:
PPS-1: polyphenylene sulfide (from Idemitsu Petrochemical, having a linear structure and having a melt viscosity of 100 poises).
PPS-2: polyphenylene sulfide (from Idemitsu Petrochemical, having a linear structure and having a melt viscosity of 170 poises).
PPS-3: polyphenylene sulfide (from Idemitsu Petrochemical, having a linear structure and having a melt viscosity of 250 poises).
PPS-4: polyphenylene sulfide (Topren's T-1, having a semi-linear structure and having a melt viscosity of 290 poises).
PPS-5: polyphenylene sulfide (from Idemitsu Petrochemical, having a linear structure and having a melt viscosity of 450 poises).
PPS-6: polyphenylene sulfide (from Idemitsu Petrochemical, having a linear structure and having a melt viscosity of 600 poises).
PPS-7: polyphenylene sulfide (from Idemitsu Petrochemical, having a linear structure and having a melt viscosity of 730 poises).
PPS-8: polyphenylene sulfide (Topren's LN-2, having a linear structure and having a melt viscosity of 900 poises).
(b) Spherical Silica:
Silica-1: spherical silica (Admatex's SO-C2, having a mean particle size of 0.5 $\mu$m).
Silica-2: Surface-treated spherical silica (Admatex's SO-C2 processed with vinyl silane, Toray-Dow Corning Silicone's SZ6300, having a mean particle size of 0.5 $\mu$m).

Silica-3: Surface-treated spherical silica (Admatex's SO-C3 processed with vinyl silane, Toray-Dow Corning Silicone's SZ6300, having a mean particle size of 1.0 μm).

Silica-4: Spherical silica (Tatsumori's TSS-6, having a mean particle size of 5 μm)

Silica-5: Surface-treated spherical silica (Tatsumori's TSS-6 processed with vinyl silane, Toray-Dow Corning Silicone's SZ6300, having a mean particle size of 5.0 μm)

Silica-6: Surface-treated spherical silica (Denki Kagaku Kogyo's FB-6D processed with epoxysilane, Toray-Dow Corning Silicone's SH6040, having a mean particle size of 6.0 μm)

Silica-7: Surface-treated spherical silica (Denki Kagaku Kogyo's FB-35 processed with epoxysilane, Toray-Dow Corning Silicone's SH6040, having a mean particle size of 12.0 μm).

Silica-8: Surface-treated, crushed amorphous silica (Denki Kagaku Kogyo's FS-74C processed with epoxysilane, Toray-Dow Corning Silicone's SH6040, having a mean particle size of 15.0 μm)

Silica-9: Surface-treated spherical silica (Admatex's SO-C1 processed with vinyl silane, Toray-Dow Corning Silicone's SZ6300, having a mean particle size of 0.2 μm).

Silica-10: Surface-treated spherical silica (Denki Kagaku Kogyo's FB-74 processed with vinyl silane, Toray-Dow Corning Silicone's SZ6300, having a mean particle size of 31.5 μm).

(c) Whiskers:

Whisker-1: Calcium metasilicate whiskers (NYCO's NYGLOS, having a fiber diameter of from 1 to 7 μm, a ratio L/D of from 5 to 20, and a specific gravity of 2.9).

Whisker-2: Potassium titanate whiskers (Otsuka Chemical's Tismo D, having a fiber diameter of from 0.1 to 0.6 μm, a ratio L/D of from 15 to 60, and a specific gravity of 3.3).

Whisker-3: Aluminium borate whiskers (Shikoku Chemical Industry's Arbolex YS2A, having a fiber diameter of from 0.5 to 1.0 μm, a ratio L/D of from 10 to 60, and a specific gravity of 3.0).

Whisker-4: Zinc oxide whiskers (Matsushita Amtec's Panatetra, having a fiber diameter of from 0.1 to 10.0 μm, a ratio L/D of from 5 to 100, and a specific gravity of 5.8).

[EXAMPLE 1]

The components (a), (b) and (c) were blended in the ratio as in Table 1. Precisely, the component (a), PPS-5 (28% by weight), and the component (b), silica-1 (72% by weight) were uniformly blended by the use of a Henschel mixer, but the component (c) was not added thereto. The resulting blend was kneaded in melt at a resin temperature falling between 300 to 350° C. and pelletized by the use of a double-screw extruder (TEM35B). The pellets were tested for the spiral flow length, the mechanical strength, the coefficient of thermal expansion and the dimensional accuracy in the manner as above, and were totally evaluated from the test data. The results are given in Table 1.

[EXAMPLES 2 TO 16, COMPARATIVE EXAMPLES 1 TO 11]

In the same manner as in Example 1, the components (a), (b) and (c) were uniformly blended in different ratios as in Tables 1 to 3 by the use of a Henschel mixer, and the resulting blends were separately kneaded in melt at a resin temperature falling between 300 to 350° C. and pelletized by the use of a double-screw extruder (TEM35B). The pellets were tested for the spiral flow length, the mechanical strength, the coefficient of thermal expansion and the dimensional accuracy in the manner as above, and were totally evaluated from the test data. The results are given in Tables 1 to 3.

TABLE 1

| Formulation | | | 1 | 2 | 3 | 4 | 5 | 6 | 7 | 8 | 9 | 10 | 11 | 12 |
|---|---|---|---|---|---|---|---|---|---|---|---|---|---|---|
| (a) | PPS-1 | (wt. %) | | | | | | | | | | | | |
| | PPS-2 | | | | | 24 | | | | 23 | | 28 | 28 | 28 |
| | PPS-3 | | | | 26 | | 28 | | | | | | | |
| | PPS-4 | | | | | | | 30 | | | | | | |
| | PPS-5 | | 28 | 28 | | | | | | | | | | |
| | PPS-6 | | | | | | | | 30 | | | | | |
| | PPS-7 | | | | | | | | | | 33 | | | |
| | PPS-8 | | | | | | | | | | | | | |
| (b) | Silica-1 | (wt. %) | 72 | | | | | | | | | | | |
| | Silica-2 | | | 72 | | | 36 | | | 32 | | | | |
| | Silica-3 | | | | 74 | | | 28 | | | | | | |
| | Silica-4 | | | | | 76 | | | | | 67 | | | |
| | Silica-5 | | | | | | 36 | 42 | | 45 | | 66 | | 66 |
| | Silica-6 | | | | | | | | 70 | | | | 66 | |
| | Silica-7 | | | | | | | | | | | | | |
| | Silica-8 | | | | | | | | | | | | | |
| | Silica-9 | | | | | | | | | | | | | |
| | Silica-10 | | | | | | | | | | | | | |
| (c) | Whisker-1 | (wt. %) | | | | | | | | | | 6 | | |
| | Whisker-2 | | | | | | | | | | | | 6 | |
| | Whisker-3 | | | | | | | | | | | | | 6 |
| | Whisker-4 | | | | | | | | | | | | | |
| SFL(mm) | | | 77 | 78 | 96 | 95 | 104 | 93 | 81 | 82 | 80 | 98 | 84 | 88 |
| Flexural Strength(MPa) | | | 136 | 145 | 135 | 128 | 146 | 150 | 152 | 134 | 154 | 142 | 140 | 138 |
| Coefficient of thermal expansion | | | | | | | | | | | | | | |

TABLE 1-continued

|  | Examples | | | | | | | | | | | |
|---|---|---|---|---|---|---|---|---|---|---|---|---|
| Formulation | 1 | 2 | 3 | 4 | 5 | 6 | 7 | 8 | 9 | 10 | 11 | 12 |
| ($10^{-5}$/K) [MD] | 1.6 | 1.6 | 1.5 | 1.4 | 1.5 | 1.7 | 1.7 | 1.3 | 1.8 | 1.5 | 1.5 | 1.5 |
| [TD] | 1.6 | 1.6 | 1.5 | 1.4 | 1.5 | 1.7 | 1.7 | 1.3 | 1.8 | 1.5 | 1.7 | 1.7 |
| Dimensional Accuracy (circularity) (× $10^{-1}$ μm) | 9 | 9 | 8 | 7 | 9 | 11 | 11 | 6 | 15 | 13 | 15 | 15 |
| Total Evaluation (○○: excellent, ○: good, Δ: bad, X: unacceptable) | ○○ | ○○ | ○○ | ○○ | ○○ | ○ | ○ | ○○ | Δ | ○ | Δ | Δ |

TABLE 2

|  |  |  | Examples | | | |
|---|---|---|---|---|---|---|
|  | Formulation |  | 13 | 14 | 15 | 16 |
| (a) | PPS-1 | (wt. %) |  |  |  |  |
|  | PPS-2 |  |  |  |  | 25 |
|  | PPS-3 |  | 26 |  | 26 |  |
|  | PPS-4 |  |  |  |  |  |
|  | PPS-5 |  |  |  |  |  |
|  | PPS-6 |  |  | 28 |  |  |
|  | PPS-7 |  |  |  |  |  |
|  | PPS-8 |  |  |  |  |  |
| (b) | Silica-1 | (wt. %) |  |  |  |  |
|  | Silica-2 |  | 30 |  | 30 | 25 |
|  | Silica-3 |  |  | 25 |  |  |
|  | Silica-4 |  |  |  |  |  |
|  | Silica-5 |  | 39 |  | 39 | 42 |
|  | Silica-6 |  |  | 42 |  |  |
|  | Silica-7 |  |  |  |  |  |
|  | Silica-8 |  |  |  |  |  |
|  | Silica-9 |  |  |  |  |  |
|  | Silica-10 |  |  |  |  |  |
| (c) | Whisker-1 | (wt. %) | 5 | 5 |  | 8 |
|  | Whisker-2 |  |  |  |  |  |
|  | Whisker-3 |  |  |  |  |  |
|  | Whisker-4 |  |  |  | 5 |  |
| SFL (mm) | | | 92 | 73 | 84 | 90 |
| Flexural Strength (MPa) | | | 146 | 155 | 142 | 133 |
| Coefficient of thermal expansion ($10^{-5}$/K) | | | | | | |
| [MD] | | | 1.5 | 1.6 | 1.4 | 1.4 |
| [TD] | | | 1.5 | 1.6 | 1.5 | 1.5 |
| Dimensional Accuracy (circularity) (× $10^{-1}$ μm) | | | 2 | 13 | 15 | 15 |
| Total Evaluation (○○: excellent, ○: good, Δ: bad, X: unacceptable) | | | ○ | ○ | Δ | Δ |

TABLE 3

|  |  |  | Comparative Examples | | | | | | | | | |
|---|---|---|---|---|---|---|---|---|---|---|---|---|
| Formulation |  |  | 1 | 2 | 3 | 4 | 5 | 6 | 6 | 7 | 8 | 9 | 10 |
| (a) | PPS-1 | (wt. %) | 28 |  |  |  |  |  |  |  | 26 |  |  |
|  | PPS-2 |  |  |  |  |  |  |  |  |  |  |  |  |
|  | PPS-3 |  |  |  |  |  |  |  |  | 18 |  | 28 | 28 |
|  | PPS-4 |  |  |  |  |  |  |  |  |  |  |  |  |
|  | PPS-5 |  |  |  | 25 | 25 | 28 | 28 | 38 |  |  |  |  |
|  | PPS-6 |  |  |  |  |  |  |  |  |  |  |  |  |
|  | PPS-7 |  |  |  |  |  |  |  |  |  |  |  |  |
|  | PPS-8 |  |  | 28 |  |  |  |  |  |  |  |  |  |
| (b) | Silica-1 | (wt. %) |  |  |  |  |  |  |  |  |  |  |  |
|  | Silica-2 |  | 72 |  |  |  |  |  |  |  | 32 | 30 | 22 | 22 |
|  | Silica-3 |  |  |  |  |  |  |  |  |  |  |  |  |
|  | Silica-4 |  |  |  |  |  |  |  |  |  |  |  |  |
|  | Silica-5 |  |  |  | 72 |  |  |  |  | 62 | 50 | 39 | 35 | 35 |
|  | Silica-6 |  |  |  |  |  |  |  |  |  |  |  |  |
|  | Silica-7 |  |  |  |  |  | 72 |  |  |  |  |  |  |
|  | Silica-8 |  |  |  |  | 75 |  |  |  |  |  |  |  |
|  | Silica-9 |  |  |  |  |  |  | 75 |  |  |  |  |  |
|  | Silica-10 |  |  |  |  |  |  |  | 72 |  |  |  |  |
| (c) | Whisker-1 | (wt. %) |  |  |  |  |  |  |  |  | 5 | 15 |  |
|  | Whisker-2 |  |  |  |  |  |  |  |  |  |  |  | 15 |
|  | Whisker-3 |  |  |  |  |  |  |  |  |  |  |  |  |
|  | Whisker-4 |  |  |  |  |  |  |  |  |  |  |  |  |
| SFL (mm) | | | 121 | 46 | 53 | 62 | 91 | 94 | 112 | kneading impossible | 110 | 88 | 76 |
| Flexural Strength (MPa) | | | 92 | 156 | 128 | 132 | 108 | 88 | 150 |  | 94 | 156 | 153 |
| Coefficient of thermal expansion ($10^{-5}$/K) | | | 1.6 | 1.6 | 1.4 | 1.4 | 1.6 | 1.6 | 2.1 |  | 1.5 | 1.4 | 1.4 |
| [MD] | | | 1.6 | 1.6 | 1.4 | 1.4 | 1.6 | 1.6 | 2.1 |  | 1.5 | 1.6 | 1.7 |

TABLE 3-continued

| | Comparative Examples | | | | | | | | | |
|---|---|---|---|---|---|---|---|---|---|---|
| Formulation | 1 | 2 | 3 | 4 | 5 | 6 | 6 | 7 | 8 | 9 | 10 |
| [TD] Dimensional Accuracy (circularity) ($\times 10^{-1}$ μm) | 9 | — | — | 21 | 11 | 11 | 20 | | 12 | 20 | 28 |
| Total Evaluation (○○: excellent, ○: good, Δ: bad, X: unacceptable) | X not strong | X difficult to mold | X difficult to mold | X molded badly | X not strong | X not strong | X dimension not accurate | X | X not strong | X dimension not accurate | X dimension not accurate |

As in Examples and Comparative Examples, the resin composition of the invention has the advantages of good moldability and good dimensional accuracy, and has well-balanced physical properties of small coefficient of thermal expansion, low anisotropy and high mechanical strength. Adding a larger amount of whiskers over the defined range to the resin composition, as in Comparative Examples 9 and 10, is unacceptable, since the dimensional accuracy (indicated by the circularity of through-holes therein) of the resin moldings is low though the flexural strength thereof is high. Contrary to this, the physical properties of the moldings of the resin composition comprising PPS having a specific viscosity and spherical silica but not containing whiskers, as in Examples 9, 7 and 6, are better than those of the other moldings, and the flexural strength of the moldings is nearly comparable to that of the other moldings.

INDUSTRIAL APPLICABILITY

The moldings of the resin composition of the invention have high dimensional accuracy and other good physical properties, and are therefore favorable to precision optical members such as optical fiber connector ferrules, etc. One important factor in optical fiber connection is that the through-holes, as in FIG. 1, of connector ferrules have high dimensional accuracy. The resin composition of the invention meets the requirements for such precision optical members.

What is claimed is:

1. An optical fiber connector ferrule molded from a polyarylene sulfide resin composition comprising (A) from 20 to 34% by weight of a polyarylene sulfide having a melt viscosity of from 150 to 800 poises at 300° C. in terms of the resin temperature and at a shear rate of 500 sec$^{-1}$, (B) from 66 to 80% by weight of spherical silica having a mean particle size of from 0.3 to 10 μm, and (C) from 0 to 12% by weight of whiskers, in which the total of the spherical silica (B) and the whiskers (C) falls between 66 and 80% by weight.

2. An optical fiber connector ferrule molded from a polyarylene sulfide resin composition comprising (A) from 22 to 28% by weight of a polyarylene sulfide having a melt viscosity of from 150 to 800 poises at 300° C. in terms of the resin temperature and at a shear rate of 500 sec$^{-1}$, (B) from 72 to 78% by weight of spherical silica having a mean particle size of from 0.3 to 10 μm, and (C) from 0 to 6% by weight of whiskers, in which the total of the spherical silica (B) and the whiskers (C) falls between 72 and 78% by weight.

3. An optical fiber connector ferrule molded from a polyarylene sulfide resin composition, of which the tabular moldings formed to have through-holes running through their cross section are such that the circularity of the through-holes is at most 1.8 μm, the coefficient of thermal expansion of the moldings (both in MD and TD) is at most $1.8 \times 10^{-5}$/K, and the flexural strength of the moldings is at least 120 MPa.

4. An optical fiber connector ferrule molded from a polyarylene sulfide resin composition according to claim 1, wherein the polyarylene sulfide has at least 70 mol % of repetitive units of the following structural formula (I):

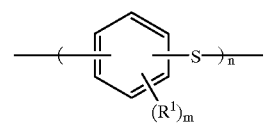

wherein R$^1$ indicates a substituent selected from an alkyl or alkoxy group having at most 6 carbon atoms, a phenyl group, a carboxyl group or its metal salts, an amino group, a nitro group, or a halogen; m indicates an integer of from 0 to 4, and n indicates a mean degree of polymerization, falling between 1.3 and 3.0.

5. An optical fiber connector ferrule molded from polyarylene sulfide resin composition according to claim 2, wherein the polyarylene sulfide resin has at least 70 mol % of repetitive units of the following structural formula (I):

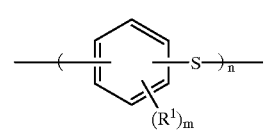

R$^1$ indicates a substituent selected from an alkyl or alkoxy group having at most 6 carbon atoms, a phenyl group, a carboxyl group or its metal salts, an amino group, a nitro group, or a halogen; m indicates an integer of from 0 to 4; and n indicates a mean degree of polymerization, falling between 1.3 and 3.0.

6. An optical fiber connector ferrule molded from a polyarylene sulfide resin composition according to claim 1, of which the tabular moldings formed to have through-holes running through their cross section are such that the circularity of the through-holes is at most 1.8 μm, the coefficient of thermal expansion of the moldings (both in MD and TD) is at most $1.8 \times 10^{-5}$/K, and the flexural strength of the moldings is at least 120 MPA.

7. An optical fiber connector ferrule molded from a polyarylene sulfide resin composition according to claim 2, of which the tabular moldings formed to have through-holes running through their cross section are such that the circularity of the through-holes is at most 1.8 μm, the coefficient of thermal expansion of the moldings (both in MD and TD) is at most $1.8 \times 10^{-5}$/K, and the flexural strength of the moldings is at least 120 MPA.

* * * * *